Dec. 14, 1937.  E. MENDENHALL ET AL  2,102,018
CONTROL SYSTEM FOR SUBMERSIBLE MOTORS AND THE LIKE
Filed Aug. 28, 1934  3 Sheets-Sheet 1
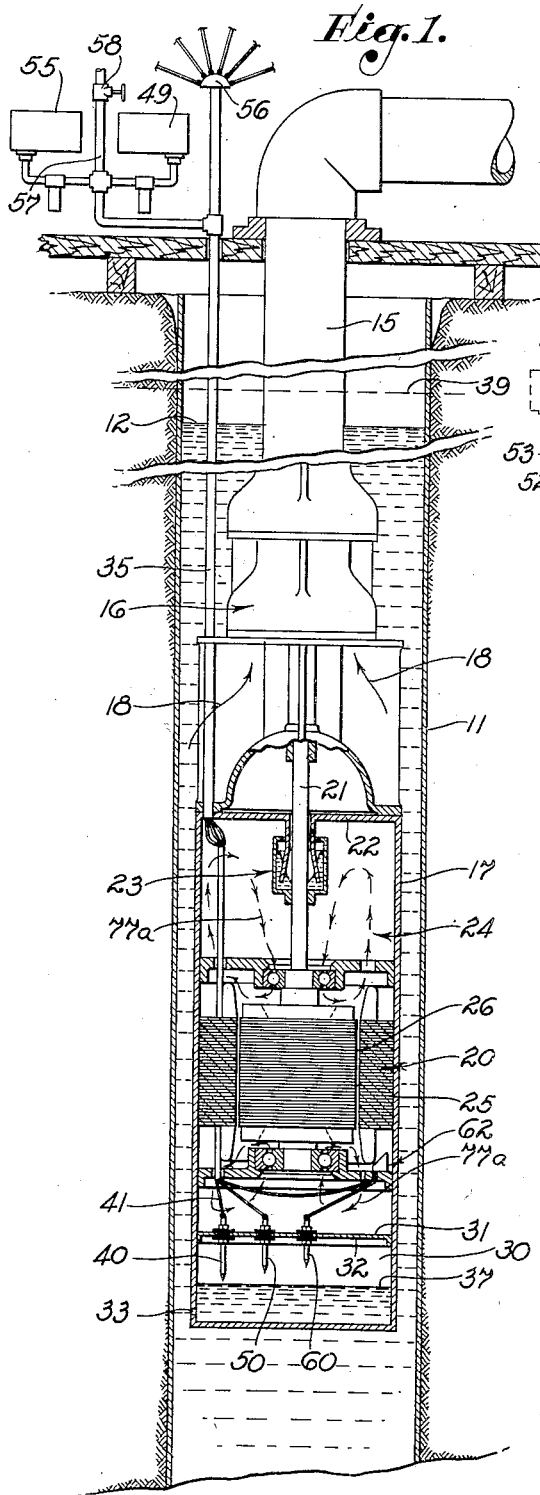
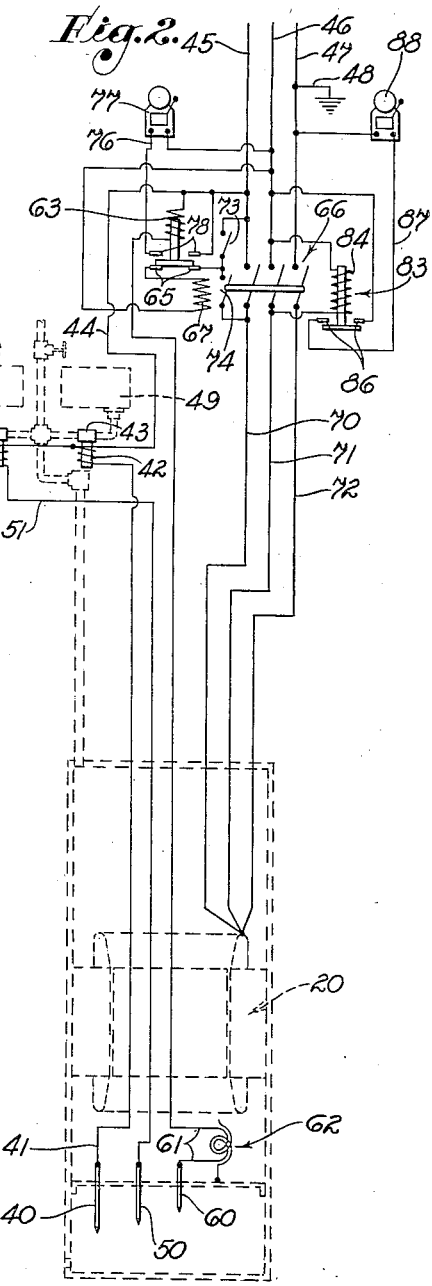
INVENTORS
EARL MENDENHALL
JUNIUS B. VAN HORN
BY
Ford W. Harris
ATTORNEY.

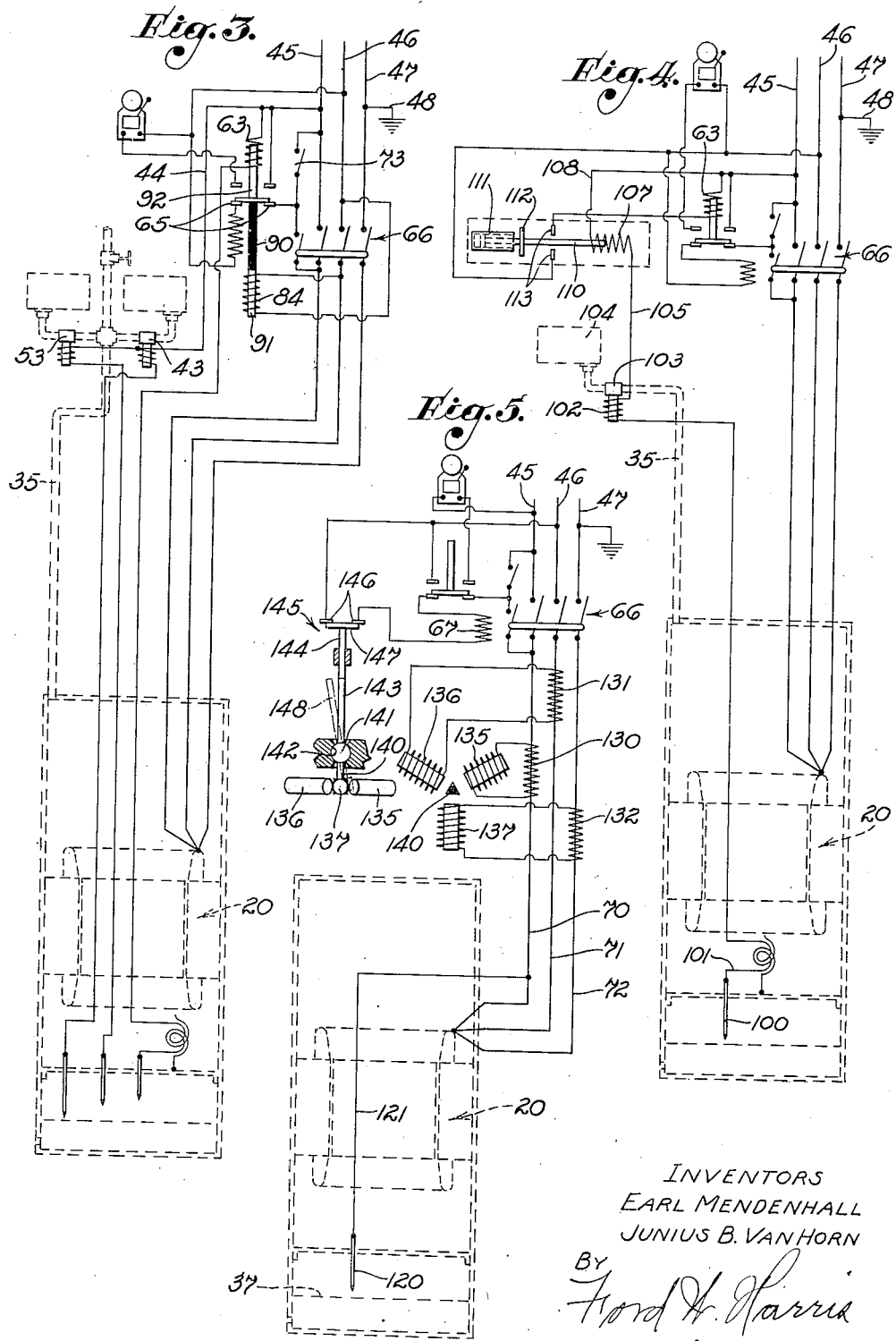

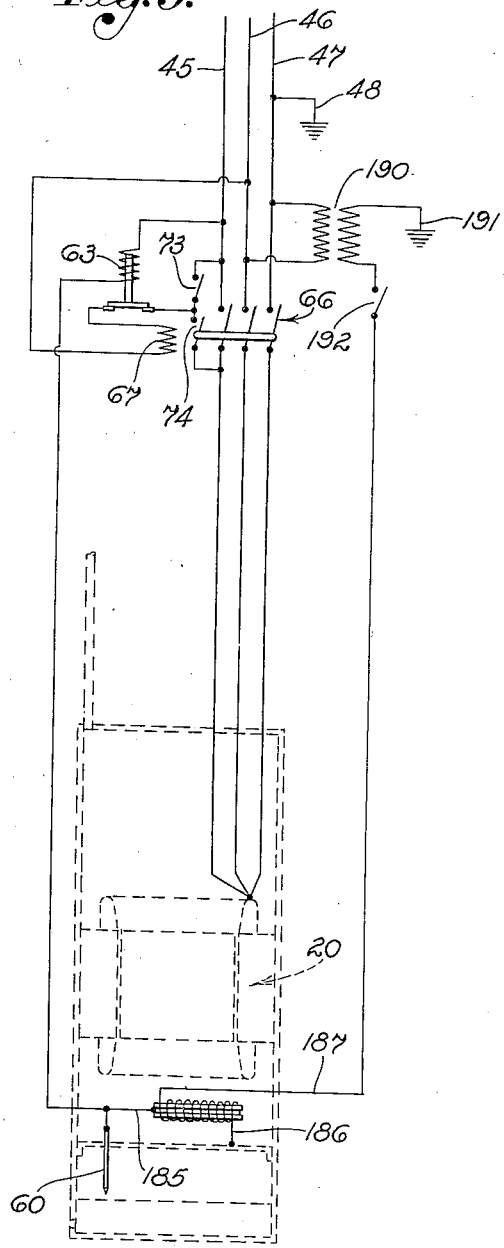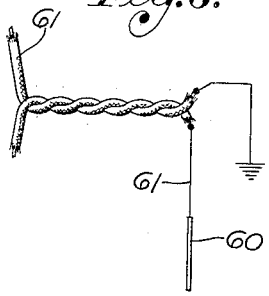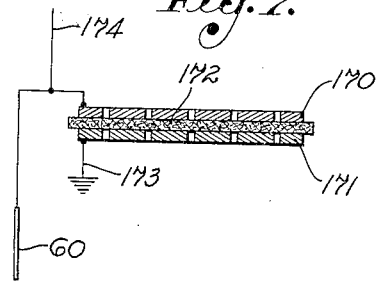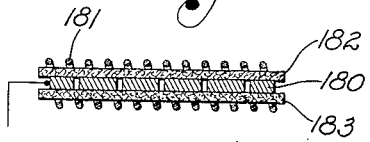

Patented Dec. 14, 1937

2,102,018

UNITED STATES PATENT OFFICE 2,102,018

CONTROL SYSTEM FOR SUBMERSIBLE MOTORS AND THE LIKE

Earl Mendenhall, Los Angeles, and Junius B. Van Horn, Alhambra, Calif., assignors, by mesne assignments, to Byron Jackson Co., Huntington Park, Calif., a corporation of Delaware Application August 28, 1934, Serial No. 741,796

9 Claims. (Cl. 172—36)

Our invention relates to the art of controlling submersible electric motors and the like in response to the conditions existing therein, or for otherwise indicating the existence of such conditions, and consists in novel methods and apparatus for accomplishing such ends.

In the preferred embodiment a shell is provided which contains an internal liquid, usually of dielectric character and having access through one means or another with a conducting liquid, usually the external liquid in which the shell is submerged. Excessive amounts of such conducting liquid should not be allowed to enter the shell, and it is an important object of the present invention to provide a system functioning in response to the relative amounts of the dielectric and conducting liquids in the shell, and to provide a novel method of controlling a structure such as a submersible motor, or otherwise indicating adverse conditions therein.

In one embodiment of the invention bodies of the liquids may be maintained in the shell in contact with each other. Experiments have shown that even if the surface of contact therebetween is maintained quiescent, there is a tendency for the dielectric liquid to be slightly contaminated by the conducting liquid, this action apparently taking place through a molecular interchange at the surface of contact. There are several ways of slowing up or preventing this contamination at the surface of contact, but should such means fail to function it is desirable to be able to control the structure so that no detrimental results will take place. In other instances the dielectric liquid may become contaminated through a defective sealing action. However, regardless of how this contamination takes place, the resulting condition is one in which the relative amounts of the two liquids in the shell is not correct, too much of the conducting liquid being present. It is an object of the present invention to provide a method and apparatus for indicating this condition to the operator, or to automatically control the system in response to such conditions.

In other instances the excessive amount of the conducting liquid in the shell may exist due to contraction or leakage of the dielectric liquid from the shell, thus allowing the body of conducting liquid to increase in size proportionately. Further objects of the invention lie in the provision of a system which indicates such a condition to the operator or which controls the structure in accordance with such conditions.

When the invention is applied to a submersible electric motor, it is desirable to de-energize the motor should an excessive amount of the external liquid enter the motor shell, and it is an object of the present invention to provide such a method and apparatus.

Such a control system may conveniently include one or more electrodes extending in the dielectric liquid toward the surface of contact of the dielectric liquid and conducting liquid, these electrodes being included in one or more control circuits, and it is an object of the present invention to provide one or more of such control circuits which can be used either for indicating purposes or control purposes.

In many systems wherein an electric means such as an electric motor is positioned inside a shell containing a dielectric liquid, the dielectric properties must be maintained to prevent electrical failure of the motor or other electric means. Even extremely minute and almost infinitesimal quantities of conducting liquid must be eliminated, and it is an object of the present invention to provide a novel structure responsive to extremely minute quantities of such a conducting liquid present in a dielectric liquid, and, in some instances, to use this structure for control or indicating purposes.

One form of such a structure which we have found particularly desirable includes a pair of conductor means spaced from each other in the dielectric liquid so that the current between these conductor means varies in response to the quantity of contaminating liquid present in the dielectric liquid. The provision of a novel form of such a structure is included among the objects of the present invention.

Such a structure is extremely sensitive, especially if a material is positioned between the conductor means which has an affinity for the conducting liquid. Even the minute quantity of moisture appearing in one's breath is sufficient to very markedly change the amount of current flowing between the conductor means in such a structure, and it is an object of the present invention to provide such a pair of conductor means of novel form between which is positioned a material having an affinity for the contaminated or conducting liquid.

This structure is so sensitive that difficulty is sometimes encountered due to the minute amount of moisture which condenses on the inner walls of the shell during or immediately after installation, this minute amount of moisture being sufficient to actuate the control or indicating system. In a submersible motor this extremely minute amount of moisture is usually unobjectionable and, in fact, the dielectric liquid appears to increase in dielectric strength when the motor has been energized for a time. If the structure is too sensitive its operation may be so critical that it is responsive to a temporary adverse condition which would be overcome upon continued operation of the motor or other electric means. To overcome this difficulty we have provided an auxiliary circuit capable of drying out the structure or otherwise removing at least a portion of the contaminating liquid from the material having affinity therefor. If the adverse condition is not cleared up, the structure will later give another indication through increase in current. However, if the condition has been corrected, no further indication will be given by this structure. It is an object of the present invention to provide a structure responsive to the amount of contaminating material in the dielectric liquid, and which includes these or equivalent features.

It is a further object of the invention to provide such a structure in which the sensitivity can be controlled.

Another object of the invention is to provide a system utilizing the conductors supplying current to the motor or other electric means for control purposes, and to provide such a system in which the unbalancing of any phase of a multiphase supply circuit is detected and used for control or indicating purposes.

Other objects and advantages of the invention will be evident to those skilled in the art from the following description.

For purpose of illustration and definiteness the invention will be hereinafter described with reference to a submersible electric motor structure. It should be understood, however, that the principles herein disclosed can be used in other capacities or for controlling other means, or can be used in other types of installations regardless of whether or not these installations are submerged.

Referring to the drawings,

Fig. 1 illustrates a submersible motor-pump unit installed in a well and incorporating certain of the control devices of our invention.

Fig. 2 is a wiring diagram of the apparatus illustrated in Fig. 1.

Figs. 3, 4, and 5 are wiring diagrams of alternative forms of the invention.

Fig. 6 is a fragmentary view illustrating the moisture-indicating structure.

Figs. 7 and 8 illustrate alternative forms of the moisture-indicating structure.

Fig. 9 is a wiring diagram of an alternative form of control system utilizing the structure shown in Fig. 8.

Referring particularly to Fig. 1, we have illustrated a well casing 11 positioned in a well and filled with water or other conducting liquid to a level indicated by the numeral 12. Supported in the well by a discharge pipe 15 extending downward therein is a pump unit 16 to the lower end of which is secured a motor shell 17, both the pump unit and the motor shell being below the surface 12. This pump unit may be of a conventional turbine type, drawing well liquid thereinto, as indicated by the arrows 18, and discharging this liquid upward through the discharge pipe 15. A motor 20 drives the runners of the pump unit 16 through a shaft 21 extending through a wall 22 of the motor shell 17, this shaft being sealed relative to this wall by a suitable sealing device 23. This sealing device is preferably of the mercury-sealed type, but could be replaced by any seal which effectively prevents water from entering the motor shell 17 at the junction of the shaft 21 and the wall 22. The motor 20 is positioned in a motor chamber 24 of the motor shell 17 and comprises the usual stator 25 and rotor 26, the latter being journalled in suitable bearings, such as those illustrated.

A balance or expansion-permitting chamber 30 is formed in the lower end of the motor shell 17, the upper end of this chamber being defined by a baffle 31 extending thereacross. This baffle includes one or more openings 32 which communicate between the motor chamber 24 and the upper end of the balance chamber 30. The lower end of this balance chamber is in open communication with the external liquid in the well through an opening 33 or other equivalent means.

In open communication with the interior of the motor shell 17, and thus in open communication with the motor chamber 24 and the upper end of the balance chamber 30 is a pipe 35 which extends upward to the surface of the ground, this pipe carrying the conductors supplying the current to the motor and also the control conductors to be hereinafter described, these conductors being of such diameter as to not completely fill the pipe 35 so that the space around these conductors is open.

The upper end of the balance chamber and the motor chamber 24 contain a dielectric liquid such as dry oil. The balance chamber 30 thus contains pressure-equalized bodies of the dielectric liquid and the external or conducting liquid, these bodies being in contact at a surface 37. Due to the equalization of pressures between the dielectric liquid and the external or conducting liquid, the dielectric liquid extends in the pipe 35 to a level 39. The level 39 is usually slightly higher than the level 12 due to a difference in density between the dielectric liquid and the external or conducting liquid, the former being usually of less density than the latter.

This system is very advantageous for it forms a dynamic system wherein the internal and external pressures on the shell 17 are always maintained substantially equal regardless of the position of the level 12. Thus, when the pump unit 16 is put into operation the level 12 drops, thus lowering the pressure on the external or conducting liquid in the balance chamber 30, and thus correspondingly lowering the level 39 of the dielectric liquid in the pipe 35. A corresponding amount of external or conducting liquid is forced through the opening 33. Due to the great difference in effective diameter between the balance chamber 30 and the pipe 35, the level 39 can change over wide limits, the corresponding movement of the surface 37 in the balance chamber being slight.

If, however, any contraction or leakage of dielectric liquid from the motor chamber takes place, or if a sufficient amount of dielectric liquid is not supplied to the motor chamber in the first place, it is possible that the surface 37 may rise to such a point as to allow the external or conducting liquid to pass through the opening 32 and thus eventually into contact with the windings of the motor 20. This would, of course, short-circuit these windings and necessitate the renewal thereof after the motor pump unit had been removed from the well. It thus becomes desirable to provide means responsive to the relative quantities of the two liquids in the motor shell and either indicating the adverse condition or remedying it.

The surface 37 may, of course, be lowered at any time by pouring an additional supply of dielectric liquid into the upper end of the pipe 35, this additional supply forcing the surface 37 downward and at the same time maintaining the equalization of pressures in the system. It is, however, desirable that this supply of dielectric liquid be accomplished automatically, and in Figs. 1 and 2 we have shown a system wherein this may be accomplished. In accomplishing this result it is necessary to provide some means operating as a function of the relative amounts of the two liquids in the motor shell 17, and in Figs. 1 and 2 we have illustrated this means as comprising an electrode 40 extending downward through an insulator from the baffle 31. A conductor 41 is connected to this electrode and extends upward to the surface of the ground through the pipe 35, being connected to one terminal of a solenoid 42 associated with a magnetic valve 43, the other terminal of this solenoid being connected by a conductor 44 to a conductor 45 of a three-phase supply line including conductors 46 and 47, the last-named conductor being grounded as indicated by the numeral 48. When the surface 37 comes in contact with the electrode 40 a circuit is thus completed from the conductor 47 through ground, through the body of external or conducting liquid in the balance chamber, and through the electrode 40, conductor 41, the solenoid 42, and the conductor 44. This energizes the solenoid and opens the valve 43 to allow dielectric liquid to move downward in the pipe 35 from a supply tank 49. This supply of dielectric liquid continues until the surface 37 is lowered from the electrode 40 at which time the circuit through the solenoid 42 is broken and the valve 43 again closes.

In the event that the supply tank 49 should be dry, or in the event that the valve 43 did not function, it would be desirable to lower the surface 37 by other means. To accomplish this end we position a second electrode 50 in the balance chamber and connect this second electrode to a conductor 51 which extends upward and is connected to one terminal of a solenoid 52 of a magnetic valve 53, the other terminal being connected to the conductor 44, as shown in Fig. 2. The valve 53 may control the supply of air or other liquid or gaseous medium from a storage means 55 to the pipe 35. Thus, if the surface 37 comes into contact with the electrode 50, a circuit is completed from the conductor 47 through the body of external or conducting liquid in the balance chamber and through the electrode 50, conductor 51, solenoid 52, and conductor 44, thereby opening the magnetic valve 53, and allowing compressed air or other medium from the storage means 55 to be introduced into the pipe 35. This forces the level of the dielectric medium in the pipe 35 downward but as soon as the surface 37 breaks contact with the electrode 50, the valve 53 closes.

If the pipe 35 is in open communication with the atmosphere, the rise or drop in the level 39 will be approximately proportional to the rise or drop of the level 12 of the external liquid, other factors being equal. Such communication to the atmosphere may be effected at a position adjacent a pothead 56 or an open pipe 57 may be utilized extending to a point above the storage means 49 or 55. With such a system the storage means 49 may be vented to the atmosphere or may be closed. If a gas supply is used with such a system, as distinct from a liquid supply from the storage means 55, the upper end of the pipe 57 may include a valve 58 forming a restricted passage to allow pressure to be built up in the pipe 35 when gas is supplied thereto, a portion of this gas escaping upward through the restricted passage and thus giving an indication of the condition of the structure. Such a restricted passage will still permit open communication between the pipe 35 and the atmosphere to permit compensation in the amount of air in this pipe upon the slower shift in conditions effected by a change in the level 12. In other instances the pipe 35 can be closed from the atmosphere by eliminating the pipe 57 or closing the valve 58 and having the pothead 56 closing the pipe 35. In this instance the air in the pipe 35 will be slightly compressed or rarefied with change in the level 39. Oil or other liquid under pressure may be then used in the supply means 49 or 55 or both, these supply means being closed from the atmosphere.

Should the level 37 continue to rise, however, due to a failure of both the supply means, it is desirable to automatically de-energize the motor. This is accomplished by an electrode 60 extending into the balance chamber a distance less than the electrodes 40 and 50. A conductor 61 is connected to the electrode and extends through a structure responsive to the amount of external or conducting liquid contaminating the dielectric liquid, this structure being hereinafter termed a moisture-indicating relay 62 for definiteness. This relay 62 is positioned in the motor chamber preferably adjacent the stator winding and the current flowing through the conductor 61 thereafter flows upward to the surface of the ground to one terminal of a solenoid 63, the other terminal thereof being connected to the conductor 45. The solenoid 63 may operate any control or indicating device, but is shown as being associated with a relay providing contacts 65 which form a part of a holding circuit for a main switch 66, this holding circuit also including a holding coil or solenoid 67 of the usual construction, this holding circuit being of a conventional type whereby energization of the solenoid 67 closes and maintains closed the main switch 66, thus supplying current from the conductors 45, 46, and 47 to intermediate conductors 70, 71, and 72 extending downward through the pipe 35 and being connected to the stator winding.

In Fig. 2 we have shown one type of holding circuit including a starting switch 73, one terminal of which is connected to the conductor 45, and the other terminal of which is connected to an auxiliary switch 74 and to one of the relay contacts 65. Closing the switch 73 sends current from the conductor 45 through these relay contacts and through the solenoid 67 to the conductor 46, thus closing the main switch 66. As soon as this switch is closed the auxiliary switch 74 likewise closes and when the starting switch 73 is opened the holding circuit of the switch is maintained by current passing through the main switch and through the auxiliary switch from the conductor 70, the current returning to the conductor 46 through the relay contacts 65 and the holding coil 67, as previously described. Should the level 37 come into contact with the electrode 60 a circuit will be completed from the conductor 47 through the body of external liquid in the balance chamber and through this electrode, the conductor 61, and the solenoid 63, to the conductor 45. This energizes the solenoid 63 and opens the relay contacts 65. This de-energizes the holding circuit of the main switch 66 and allows this switch to move into open position shown in Fig. 2.

In addition, however, it is sometimes desirable to close an alarm circuit 76 including a bell 77 or other indicating means when this condition occurs, and in accomplishing this end we utilize contacts 78 on the relay, which contacts are closed when the solenoid 63 is energized, thus completing a circuit from the conductor 45 through the contacts 78 and through the circuit 76 and the bell 77, the current returning to the conductor 46. The attention of the operator is at once called to this condition, and should he attempt to start the motor by closing the starting switch 73, no harm will result in view of the fact that the holding circuit of the switch cannot be closed due to the relay opening the contacts 66.

The moisture-indicating relay 62 is also a means responsive to the relative amounts of said dielectric liquid and external or conducting liquid in the motor shell 17, this relay being responsive primarily to the amount of the contaminating liquid which has become associated with the dielectric liquid. It will also function should the surface 37 rise to this relay. Such contamination may take place through several factors such as leakage of conducting liquid through imperfections in the motor shell or leakage through the seal 23, especially if certain types of seals are utilized. In addition, under unfavorable conditions there may be a slight contamination of the dielectric liquid at the surface 37, especially if portions of the interior of the shell 17 are not heated as by the presence of the motor 20 or other means.

The dielectric liquid is continuously circulated by the rotation of the rotor 26 or by other means, being moved through circulation paths such as indicated by the arrows 77a of Fig. 1, this being desirable in view of the cooling action exerted on the motor or other electric means. While this circulation is very desirable in this regard, it also serves to distribute any contaminating particles throughout the shell 17. It thus becomes desirable to know the condition of the dielectric liquid and the relative amounts of the two liquids in the material being circulated. The moisture-indicating relay 62 may be used in this capacity, being preferably positioned in the path of the circulating liquid and near the motor winding.

This relay 62 is of very simple construction and may include any two conductor means spaced from each other in the dielectric liquid so that the current flowing therebetween varies with the amount of conducting liquid in the dielectric liquid. The change in current can be used for indicating or control purposes, for instance in operating the magnetic valves 43 or 53, in operating a disconnect means as by opening the holding circuit of the switch 66, or in operating any visible or audible indicating means.

In practice this moisture-indicating relay 62 may be formed in a manner indicated in Fig. 6 by utilizing two cotton-covered conductor means twisted together so that the cotton insulation is positioned between the conductor means. The cotton covering on these conductor means has an affinity for any of the conducting liquid present in the dielectric liquid. In this embodiment there is impressed between the conductor means a potential, so that when the cotton covering attracts the conducting liquid which may be present in the dielectric liquid, the resistance between the conductors is decreased, thus changing the current flowing through any control circuit or any indicating circuit which may be connected to the moisture-indicating relay 62. In the embodiment shown one of the conductor means of this relay may be connected in series with the intermediate portion of the conductor 61 so as to form a part thereof, while one end of the other conductor means is grounded to some portion of the motor shell 17, the other end of this other conductor means being electrically unconnected. With this form of connection the potential between the conductors 45 and 47 is impressed across the conductor means so that decrease in the resistance between the conductor means will effect an increase in the current flowing in a circuit from the conductor 47 through ground and through one of the conductor means, thence to the other of the conductor means and returning to the line through the conductor 61 and the solenoid 63. If this current becomes sufficiently large, the solenoid will be operated and the switch 66 opened, as previously described. The motor cannot again be energized until the adverse condition is corrected, as by supplying additional dielectric medium to the pipe 35 in sufficient quantities to replace or dilute the existing contaminated dielectric liquid, and until the moisture content of the cotton-covered insulation is decreased. This decrease in moisture content is in some instances automatically effected due to the heating action between the two conductor means of the moisture-indicating relay 62. In other instances it is necessary to force an auxiliary current therethrough to effect this drying action, or in extreme instances to remove the motor-pump unit from the well. It is not, however, necessary that we use cotton as an insulating medium, though this type of relay has been found to be both cheap and very effective in practice. Other types of insulating media may be utilized, whether or not the particular medium used has a selective affinity for the conducting liquid.

If the motor pump is not used for long periods of time, it is conceivable that the dielectric liquid may become contaminated with the external or conducting liquid to such an extent that to start the motor would be detrimental. The moisture-indicating relay 62 will ordinarily take care of such a situation, but in the event that such a relay is not used or in the event that it becomes temporarily inoperative, we prefer to utilize an auxiliary relay 83 providing a solenoid winding 84 connected between the conductors 46 and 71 and thus around the main switch 66. This relay provides contacts 86 which are closed when the solenoid winding 84 is energized, thus closing an alarm circuit 87 including a bell or other alarm means 88. Assuming that the dielectric liquid becomes contaminated around the motor windings, it will at once be apparent that current will flow from the switch 66 through the solenoid winding 84 and through the conductor 71 to the motor winding. If the amount of contamination has become sufficient to carry a minute amount of current from any phase of the motor winding to ground, current will flow through the conductor 71 and will return through the grounded motor shell 17 to the conductor 47, thus energizing the solenoid winding 84 and closing the alarm circuit.

In Fig. 3 we have shown the solenoid winding 84 of the auxiliary relay 83 as being associated with the relay in the holding circuit of the switch 66 so that energization of the solenoid winding 84 will make it impossible to start the motor even though the starting switch 73 is depressed. In accomplishing this end the pallet of the relay in the holding circuit has an extension 90 on which a magnetic core 91 is positioned, this core being raised by the solenoid 84 when energized. A magnetic core 92 is acted upon by the solenoid 63. Both the solenoid 63 and the solenoid 84 tend, when energized, to raise the plunger of the relay, thereby opening the holding circuit. By this means it becomes impossible to start the motor if the relay in the circuit opens the contact 65 either because the surface 37 is raised to contact the electrode 60 or because a circuit has been completed through the solenoid 84 due to current passing from the winding of the motor to the grounded shell, as previously described. Thus, the system shown in Fig. 3 eliminates the use of an auxiliary alarm circuit 87.

In Fig. 4 we have shown still another system which is simpler than the system shown in Fig. 2. In this system only a single electrode need be used, this electrode being indicated by the numeral 100 and being connected to a conductor 101 which may in turn be connected to a moisture-indicating relay, as previously described. The conductor 101 also conducts current to a solenoid winding 102 of a magnetic valve 103 controlling the flow from a supply tank 104 in a manner previously described. The solenoid 102 is also connected through a conductor 105 to one terminal of a solenoid 107, the other terminal being connected by a conductor 108 to the conductor 45 of the supply line.

In this form of the invention, when the surface 37 comes into contact with the electrode 100, the solenoids 102 and 107 are simultaneously energized and remain energized until the surface 37 moves out of contact with the electrode 100. The energizing of the solenoid 102 opens the valve 103 and allows dielectric liquid or other material to be supplied through the pipe 35, as previously described. The energization of the solenoid 107 exerts a force on a plunger 110 in a rightward direction, this movement being opposed by the action of a dashpot 111 which may be of any desired construction. So long as the solenoid 107 remains energized, however, the plunger 110 moves slowly to the right and after a predetermined length of time, a pallet 112 on the plunger 110 bridges across contacts 113, thus completing a circuit from the conductor 45 through the solenoid 63 of the relay associated with the holding circuit, the current returning to the conductor 46 of the supply line. This, of course, opens the main switch and de-energizes the motor.

In the form of the invention shown in Fig. 4, if the dielectric liquid supplied through the pipe 35 does not lower the surface 37 within a predetermined time, the time-limit relay will de-energize the motor. If subsequently the level 37 is lowered from the electrode 100, the motor will not automatically start in view of the fact that the main switch is open and current cannot thus flow through the auxiliary switch 74 and the holding circuit of this switch. The system can, however, be set into operation by closing the starting switch 73 in the usual manner. The time-limit relay disclosed in Fig. 4 is, of course, diagrammatic and other forms of time-operated switches may be utilized.

In Fig. 5 we have illustrated a system wherein no auxiliary control wires are necessary, the only wires extending through the pipe 35 being the conductors 70, 71, and 72. In this form of the invention we provide an electrode 120 connected to a conductor 121 which is connected to the conductor 70 in the motor chamber. Each of the conductors 70, 71, and 72 has associated therewith a current transformer, and the object of the system shown in Fig. 5 is to de-energize the motor when the current in the phases becomes unbalanced. This will, of course, take place when the surface 37 contacts the electrode 120, at which time the current in the conductor 70 is increased due to a circuit being formed from the conductor 47 through the body of external liquid in the balance chamber and through the electrode 120 and the conductor 121.

Any relay system may be utilized for determining when such an unbalanced condition exists. In Fig. 5 we have shown one system, indicating the current transformers associated with the conductors 70, 71, and 72 by the numerals 130, 131, and 132 respectively. These current transformers are connected to solenoids 135, 136, and 137 respectively, which are disposed 120° apart, the inner faces of which are spaced from each other as diagrammatically shown in Fig. 5. Extending between these inner faces is an armature 140 which has been shown as being triangular in shape. As shown to the left in Fig. 5, this triangle-shaped armature 140 is connected to a ball 141 journalled in a socket 142. Extending from this ball is a support 143 which normally engages the lower end of a plunger 144 of an auxiliary relay 145 including contacts 146 forming a part of the holding circuit of the main switch. The contacts 146 are normally closed by a pallet 147 associated with the plunger 144, but if the support 143 is moved to one side, as indicated by the dotted line 148, the plunger 144 will drop, thus breaking the holding circuit of the switch 66. Such a movement of the support 143 takes place when the triangle-shaped armature 140 is moved from its central position with relation to the solenoids 135, 136, and 137. Normally, when the three phases of the system are balanced the armature 140 will be spaced equally from each of the solenoids. If, however, the current through the conductor 70 becomes greater than the current through the conductors 71 or 72, for instance, the solenoid 135 will exert a greater pull on the armature 140 and will draw this armature toward the core of this solenoid, thereby moving the support 143 into its dotted line position 148 and thereby allowing the plunger 144 to drop to de-energize the holding circuit. This at once de-energizes the motor and the motor cannot be again energized until the auxiliary relay 145 is manually reset.

In other instances alternative forms of the moisture-indicating relay 62 can be used in conjunction with any of the systems hereinbefore described. It has been found that the type of moisture-indicating relay illustrated in Fig. 6 is extremely sensitive. Sensitivity is, of course, essential, for we have found that one part of conducting liquid in ten thousand parts of the dielectric liquid will produce sufficient contamination to detrimentally affect and in some instances burn out the motor or other electric means. However, the moisture-indicating relay shown in Fig. 6 is responsive to much smaller quantities of the contaminating liquid. Experiments have shown that when a submersible electric motor, for instance, is first installed, the dielectric strength of the dielectric liquid will decrease until the motor has been operated for a period of time, after which the dielectric strength again increases and in some instances becomes even greater than when the structure was originally installed. This slight temporary decrease in dielectric strength immediately after installation we attribute to the slight amount of moisture which condenses on the walls of the motor shell and on the other parts of the structure which contaminates the dielectric liquid. The subsequent increase in dielectric strength is no doubt due to the purifying action of the heat generated when the motor or other electric means is operating, together with the circulation system shown. The maintenance of differential temperatures in different portions of the motor shell appears to be a factor in this regard, especially as to preventing contamination adjacent the surface 37, this contamination being apparently effected through a molecular interchange at the surface of contact. With the type of moisture-indicating relay shown in Fig. 6, the preliminary or temporary decrease in dielectric strength is often sufficient to operate this extremely sensitive device, thus giving an indication of a condition which would automatically correct itself should the motor continue to operate. It thus becomes desirable in some instances to use a less sensitive moisture-indicating device. Such alternative devices are illustrated in Figs. 7, 8, and 9.

Referring particularly to Fig. 7, a moisture-indicating relay is shown as including a pair of conductor means 170 and 171 each formed of a metallic plate preferably perforated as shown. Positioned between these conductor means is a member 172, which, if desired, may be made of a substance having an affinity for the contaminating liquid. In this connection we find it very satisfactory to use a strip of fiber in this regard, different fibers producing different sensitivities. One of these conductor means may be grounded as indicated by the numeral 173 and the other may be connected to a conductor 174 corresponding to the conductor 61 of Fig. 2. If desired, an electrode 60 may be used and connected to the conductor 71 to perform the functions previously set forth.

Another form of moisture-indicating relay which is often desirable is illustrated in Fig. 8. Here two conductor means 180 and 181 are utilized. The conductor means 180 is formed of a metallic plate or rod, preferably perforated as shown. The conductor means 181 may take the form of a coil of resistance wire disposed around the conductor means 180. Members 182 and 183 are positioned on opposite sides of the conductor means 180 and separate this conductor means from the coil of resistance wire. These members 182 and 183 may be formed of a material having an affinity for the contaminating liquid, fiber being very satisfactory in this regard, although other substances can be used.

Fig. 9 illustrates one mode of connecting the moisture-indicating relay shown in Fig. 8. A conductor 185 corresponding to the conductor 61 of Fig. 2 is electrically connected to the conductor means 180, and may also be connected to the electrode 60. One terminal of the coil of resistance wire 181 is grounded as indicated by the numeral 186, the other terminal being connected to a conductor 187 which extends upward in circuit with the secondary winding of the transformer 190 one terminal of which is grounded as indicated by the numeral 191, there being a switch 192 in this circuit. The primary winding of the transformer 190 is connected between the conductors 46 and 47. The switch 192 is normally open during the operation of the structure. Even when the dielectric strength of the dielectric liquid is entirely satisfactory a minute current will flow from the conductor 47 through ground, through the conductor 186, and thence through the members 182 and 183 to the conductor means 180 of the moisture-indicating relay, returning to the conductor 45 through the conductor 185 and the solenoid winding 63. This current will not, however, be sufficient to open the holding circuit of the switch 66. Should the dielectric liquid become contaminated, the current through this circuit will increase in sufficient quantity to open the switch 66.

It is desirable to be able to ascertain whether or not this adverse condition is only a temporary one which would automatically clear up on further operation of the motor, or whether additional dielectric liquid should be supplied. In effecting this end the switch 192 may be closed to complete an auxiliary circuit from the transformer 190 through ground and through the coil of resistance wire 181, the current returning to the transformer through the conductor 187 and the switch 192. This auxiliary or heating circuit delivers sufficient current to the coil of resistance wire to locally heat the moisture-indicating relay sufficiently to drive out at least a portion of the conducting liquid which may have become associated with the members 182 or 183. It is not essential to actually vaporize this conducting liquid, though this can be done if desired. Usually it is sufficient to pass a small current through the coil of resistance wire to produce a localized increase in temperature sufficient to expel a portion of the conducting liquid which has become associated with these members 182 and 183. Thereafter the switch 66 can be again closed and the motor set into operation. If further operation of the motor does not alleviate the adverse condition the moisture-indicating relay will again operate, thus indicating that additional dielectric liquid should be supplied or that other means should be used to correct the difficulty. If, however, the motor continues to operate without being de-energized by the moisture-indicating relay, it is a clear indication that the adverse condition was only temporary. Should an excessive amount of the conducting liquid again become associated with the dielectric liquid, the mosture-indicating relay will, of course, operate to de-energize the motor.

While in Fig. 9 we have shown only two control conductors 185 and 187 extending upward to the top of the well, it will be clear that the conductor 185 serves a dual purpose in conducting current either from the electrode 60 or the moisture-indicating device. It is thus sometimes desirable to use two separate conductors in place of the single conductor 185, one extending upward from the electrode 60 and the other from the conductor means 180 of the moisture-indicating relay. Such conductors may be used for separate control or indicating purposes, but preferably are both connected to the relay 62 for de-energizing the motor.

It should be clearly understood that the moisture-indicating relay can be used for purposes of indication as well as direct control. In this connection the pallet switch operated by the solenoid winding 63 can be visually observed, or any other suitable indicating means can be connected in circuit with the moisture-indicating relay. It should also be clear that various features of the invention can be used individually. Thus, it is not always essential that a system be provided which will supply both dielectric oil or air or other medium to the motor. In many installations we install only the means for supplying additional dielectric liquid to the motor. In still other installations it is possible to dispense with this means for supplying dielectric liquid, and utilize only the electrode 60 for de-energizing the motor or for indicating the presence of an adverse condition. In some instances even this electrode can be dispensed with and the moisture-indicating relay utilized to indicate an undesirable increase in relative amounts of the liquids in the motor shell, either through a rise in level of the surface 37 so that the conductor means of the moisture-indicating relay are short-circuited, or by the presence of excessive amounts of contaminated material dispersed in the dielectric liquid. In other instances it is possible to utilize only one or more electrodes 40, 50, or 60 for control or indicating purposes regardless of the presence of the moisture-indicating relay 62. In this connection any of these electrodes, in effect, act in a manner somewhat analogous to the moisture-indicating relay if through molecular interchange at the surface 37, the material between this surface and the electrode becomes contaminated with conducting liquid in sufficient degree to permit a current flow between the surface 37 and this electrode even though the surface 37 does not directly contact the electrode. In this instance the electrode corresponds to one of the conductor means of the moisture-indicating relay, while the body of conducting liquid corresponds to the other conductor means. Such a system is not, however, as sensitive as the moisture-indicating relay shown in Figs. 6, 7, or 8.

It will be understood that the particular apparatus illustrated has been shown only diagrammatically, and that many modifications in the apparatus, as well as in the circuits utilized can be made without departing from the spirit of this invention. Thus, more sensitive relays or other amplifying devices can be incorporated in the control circuits in addition to the apparatus shown. So also, if local regulations prevent the grounding of one of the supply conductors, the potentials utilized for control or indicating purposes can be obtained from auxiliary sources, such as batteries or transformers, one terminal of which can be grounded if desired.

The present application is a continuation-in-part of our co-pending application Serial No. 524,494 filed March 23, 1931, now Patent No. 2,002,912.

We claim as our invention:

1. In combination: a shell containing a dielectric liquid and having access to a conducting liquid tending to contaminate said dielectric liquid; circuit means extending from said shell; relay means in said dielectric liquid responsive to the amount of said conducting liquid associated therewith and electrically connected to said circuit means to change the current flowing through said circuit means in response to the amount of said conducting liquid contaminating said dielectric liquid, said relay means including means having an affinity for said conducting liquid; means for heating said relay means for driving from said means having an affinity for said conducting liquid at least a part of the conducting liquid associated therewith; and means exterior of said shell and operatively connected to said circuit means to be responsive to current flowing through said circuit means.

2. In combination in a submersible structure: a shell containing a dielectric liquid and having access to a conducting liquid tending to contaminate said dielectric liquid; a control means for said submersible structure; a control circuit operatively connected to said control means; a pair of conductor means spaced from each other in said dielectric liquid and connected in said control circuit whereby the current flowing in said control circuit changes in response to the amount of said conducting liquid contaminating that portion of said dielectric liquid adjacent said pair of conductor means; and an auxiliary circuit for sending current through one of said conductor means in sufficient quantity to heat same.

3. A combination as defined in claim 2 including means intermediate said spaced conductor means and having an affinity for said conducting liquid, said auxiliary circuit heating this means to drive off at least a portion of the conducting liquid associated therewith.

4. In combination: a shell containing a dielectric liquid and having access to a conducting liquid tending to contaminate said dielectric liquid; a pair of conductor means in said dielectric liquid and spaced from each other, one of said conductor means being in the form of a perforated plate whereby the space between said conductor means contains dielectric liquid contaminated with said conducting liquid; circuit means connected to said conductor means; and control means responsive to the current flowing in said circuit means.

5. In combination: a shell containing a dielectric liquid and having access to a conducting liquid tending to contaminate said dielectric liquid; a pair of conductor means in said dielectric liquid and spaced from each other, one of said conductor means comprising a heating element; circuit means connected to said pair of conductor means; control means responsive to the current flowing in said circuit means; and means for heating said heating element to decrease the amount of said conducting liquid in the dielectric liquid between said conductor means.

6. A combination as defined in claim 4 including a body of material having an affinity for said conducting liquid and positioned between said conductor means.

7. A combination as defined in claim 4 in which both of said conductor means comprise interstitial structures and including a body of material having an affinity for said conducting liquid and positioned between said perforated plates.

8. In combination: a shell containing a dielectric liquid and having access to a conducting liquid tending to contaminate said dielectric liquid; means responsive to the amount of said conducting liquid associated with a portion of said dielectric liquid; means in said shell acting to purify said dielectric liquid by removing the conducting liquid therefrom; and means for removing said conducting liquid from said portion of said dielectric liquid at a rate faster than said means in said shell will effect purification of the dielectric liquid in said shell.

9. A combination as defined in claim 2 in which one of said conductor means includes a central conducting element and in which the other of said conductor means includes a coil of wire surrounding said central conducting element and connected in said auxiliary circuit.

EARL MENDENHALL.
JUNIUS B. VAN HORN.